(12) United States Patent
Sullivan et al.

(10) Patent No.: US 7,518,991 B2
(45) Date of Patent: Apr. 14, 2009

(54) SYSTEM AND METHOD FOR TROUBLESHOOTING BROADBAND CONNECTIONS

(75) Inventors: Marc Andrew Sullivan, Austin, TX (US); Adam Lee Klein, Cedar Park, TX (US); Wesley McAfee, Cedar Park, TX (US); Charles Scott, Austin, TX (US); Donn E. Wilburn, Jr., Seagoville, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 874 days.

(21) Appl. No.: 10/975,034

(22) Filed: Oct. 27, 2004

(65) Prior Publication Data

US 2006/0087978 A1    Apr. 27, 2006

(51) Int. Cl.
*H04L 12/00* (2006.01)
*G06F 11/00* (2006.01)
(52) U.S. Cl. ....................... 370/225; 370/242
(58) Field of Classification Search ................ 370/242, 370/225, 227, 228
See application file for complete search history.

(56) References Cited

U.S. PATENT DOCUMENTS

| | | | |
|---|---|---|---|
| 6,147,965 A | 11/2000 | Burns et al. | |
| 6,411,623 B1 * | 6/2002 | DeGollado et al. | 370/395.1 |
| 6,490,620 B1 * | 12/2002 | Ditmer et al. | 709/224 |
| 6,574,308 B1 | 6/2003 | MacDonald et al. | |
| 6,658,052 B2 | 12/2003 | Krinsky et al. | |
| 6,725,176 B1 | 4/2004 | Long et al. | |
| 6,853,680 B1 | 2/2005 | Nikolich | |
| 7,092,364 B1 * | 8/2006 | Franklin et al. | 370/252 |
| 2003/0021388 A1 | 1/2003 | Starr et al. | |
| 2003/0079028 A1 * | 4/2003 | Kortum et al. | 709/229 |
| 2003/0231206 A1 * | 12/2003 | Armstrong | 345/744 |

* cited by examiner

*Primary Examiner*—Min Jung
(74) *Attorney, Agent, or Firm*—Toler Law Group

(57) ABSTRACT

A method for troubleshooting broadband connections, e.g., a digital subscriber line (DSL) connections, includes detecting a problem with the broadband connection at an end device. Then, a determination is made as to whether the problem can be resolved at the end device. After determining that the end device cannot resolve the problem, a request is sent to a data network connection device connected remotely to the end device to attempt to determine the cause of the problem. In particular embodiment, the problem at the end device can be resolved based on information obtained by the data network connection device. Further, the problem at the end device can be resolved based on information obtained by the end device.

30 Claims, 4 Drawing Sheets

SYSTEM AND METHOD FOR TROUBLESHOOTING BROADBAND CONNECTIONS

FIELD OF THE DISCLOSURE

The present disclosure relates generally to the troubleshooting of broadband connections.

BACKGROUND

Broadband Internet connections, e.g., digital subscriber line (DSL) connections, asymmetric digital subscriber line (ADSL) connections, cable connections, etc., are extremely popular. However, from a service provider perspective, the expenses associated with supporting broadband service can be relatively high. The expense is largely due to the lack of maturity of the technology and the manner in which computer operating systems handle broadband connectivity. Due to the high cost of support, a variety of software programs for supporting broadband connectivity have been developed. These software programs include programs that are installed on a user computer to aid in diagnosing and fixing problems without requiring a costly call to a customer service help desk at service provider. Further, when diagnosing and fixing problems with a broadband connection, these software programs typically rely on information that is obtained only by the computer and not on information that can be obtained by other equipment in the network.

Accordingly, there is a need for an improved system and method for troubleshooting broadband connections.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
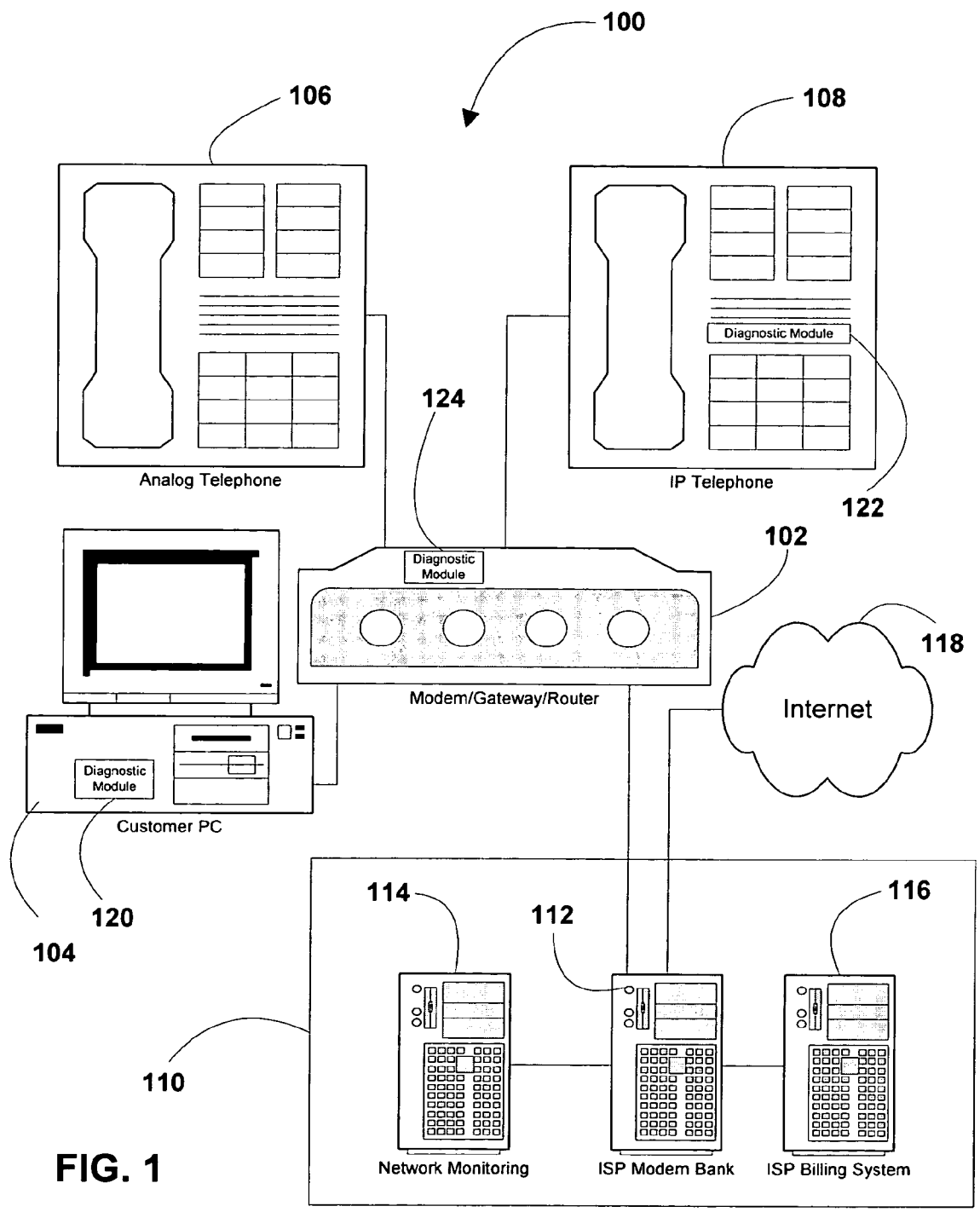
FIG. 1 is a diagram of a data network system.

A method for resolving one or more problems with a broadband connection, e.g., a digital subscriber line (DSL) connection, is provided and includes detecting a problem with the broadband connection at an end device. Then, a determination is made as to whether the problem can be resolved at the end device. After determining that the end device cannot resolve the problem, a request is sent to a data network connection device connected remotely to the end device to attempt to determine the cause of the problem. In particular embodiment, the problem at the end device can be resolved based on information obtained by the data network connection device. Further, the problem at the end device can be resolved based on information obtained by the end device.

In a particular embodiment, an analog data communication session is established between the data network connection device and an Internet service provider. Also, using the analog data communication session, an inquiry is sent to a billing server to determine if the problem is a billing problem. An indication can be received from the billing server indicating that the problem is a billing problem. In a particular embodiment, the analog communication session can also be used to determine if the problem is a network problem.

In a particular embodiment, the method further includes determining if a broadband connection is available. When a broadband connection is available, a broadband data communication session is initiated via the data network connection device using a first set of authentication credentials. On the other hand, when the broadband connection is unavailable, an analog communication session is initiated via the data network connection device using a second set of authentication credentials. In a particular embodiment, the second set of authentication credentials is different from the first set of authentication credentials. In one particular embodiment, the end device is a computer. In another particular embodiment, the end device is an Internet protocol telephone. Further, in a particular embodiment, the data network connection device is a router, a modem, or a gateway.

In a particular embodiment, the data network connection device can be used to initiate a broadband communication session with an Internet service provider using a first set of authentication credentials. Also, the data network connection device can be used to initiate an analog communication session with an Internet service provider using a second set of authentication credentials that are different from the first set of authentication credentials. Additionally, the data network connection device can be used to initiate a broadband communication session with an Internet service provider using a second set of authentication credentials that are different from the first set of authentication credentials.

In another embodiment, a network system is provided and includes a data network connection device. An Internet service provider is remotely coupled to the data network connection device. Further, a computer is coupled to the data network connection device. The network system also includes a first diagnostic module that is located within the computer. In a particular embodiment, the data network connection device is configured to establish a first data network connection to the Internet service provider using a first set of unique authentication credentials. Further, the data network connection device is configured to establish a second data network connection between the data network connection device and the Internet service provider when a problem with the first data network connection is determined by the first diagnostic module within the computer.

In yet another embodiment, a method for troubleshooting a data network connection is provided and includes establishing a first data network connection between an end device and an Internet service provider using a first set of unique authentication credentials. When a problem with the first data network connection is determined by a diagnostic module within the end device, a second data network connection is established between a data network connection device and the Internet service provider. Particularly, the data network connection can be used to obtain network information for troubleshooting the problem with the first data network connection. That information can be transmitted to the end device.

Referring to FIG. 1, a data network system is shown and is generally designated 100. As illustrated, the data network system 100 includes a data network connection device 102, e.g., a modem, a gateway, a router, etc. Further, a computer 104 is connected to the data network connection device 102. In a particular embodiment, the computer 104 is a desktop computer, a laptop computer, a handheld computer, or a set top box that includes a microprocessor. FIG. 1 also shows an analog telephone 106 and an Internet protocol (IP) telephone 108 that are coupled to the data network connection device 102. In a particular embodiment, the computer 104 and the IP telephone 108 can be considered end devices and they can receive content via a broadband connection, e.g., a digital subscriber line (DSL) connection. In a particular embodiment, the computer 104 can also receive signals via an analog connection. Further, the analog telephone 106 can receive content via an analog connection.

As further shown in FIG. 1, the data network connection device 102 is connected to an Internet service provider (ISP) 110 via one or more broadband connection, one or more analog connections, one or more wireless connections, or a combination thereof, e.g., a broadband connection and an analog connection. Moreover, one or more of the connections can be established via a wired connection, a fiber optic connection, or a wireless connection, such as, an 802.11 connection. Specifically, the data network connection device 102 is connected to an ISP modem bank server 112 at the ISP 110. FIG. 1 also shows that a data network monitoring server 114 and an ISP billing system server 116 can be connected to the ISP modem bank server 112 within the ISP 110. Accordingly, each server 112, 114, 116 can be accessed by the computer 104, the analog telephone 106, and the IP telephone 108 via the data network connection device 102. As shown in FIG. 1, the ISP 100 can provide connectivity to a data network 118, e.g., the Internet. In a particular embodiment, the broadband connections are established via one or more a DSL connections.

FIG. 1 also indicates that the computer 104 can include a diagnostic module 120. Additionally, the IP telephone 108 can include a diagnostic module 122. Further, the data network connection device 102 can include a diagnostic module 124. In a particular embodiment, each diagnostic module 120, 122, 124 is a software tool that includes one or more logic steps that can be executed in order to diagnose one or more problems with a broadband connection, such as a broadband connection between the computer 104 and the ISP 110 established via the data network connection device 102.

Figure 2:
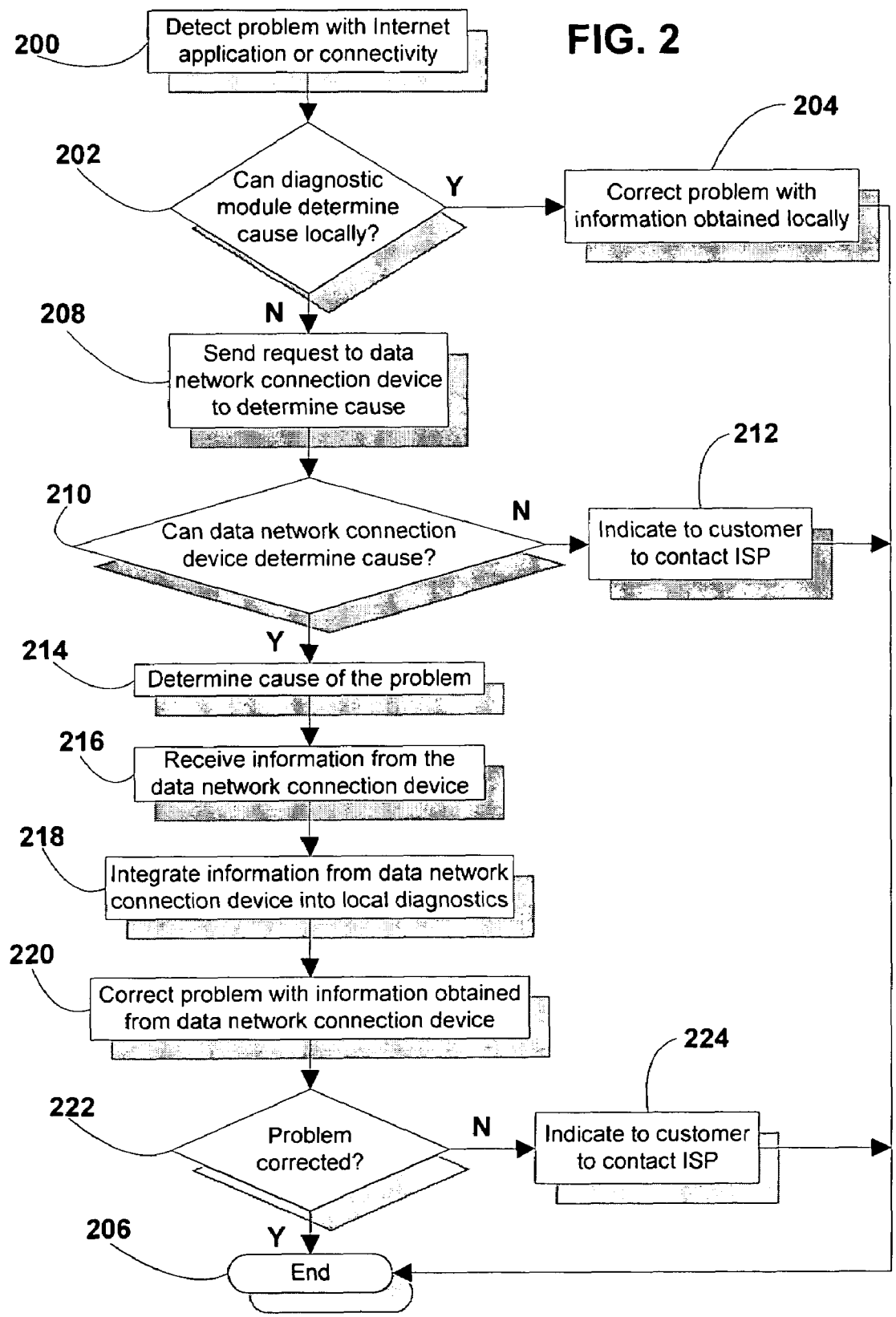
FIG. 2 is a flow chart to illustrate a method for troubleshooting a broadband connection.

Referring to FIG. 2, a method for troubleshooting a broadband connection is shown and commences at block 200 where a problem is detected with a broadband application at the computer 104 (FIG. 1) or with broadband connectivity to the computer 104 (FIG. 1). At decision step 202, a determination is made in order to ascertain whether the diagnostic module 120 (FIG. 1) at the computer 104 (FIG. 1) can determine the cause of the problem locally. If so, the logic proceeds to block 204 and the problem is corrected locally by the diagnostic module 120 (FIG. 1) within the computer 104 (FIG. 1). The logic then ends at state 206.

Returning to decision step 202, if the diagnostic module 120 (FIG. 1) cannot determine the cause of the problem locally, a request is sent to the data network connection device 102 (FIG. 1) to determine the cause of the problem. In a particular embodiment, the data network connection device 102 (FIG. 1) is point-to-point protocol over Ethernet (PPPOE) enabled and the request is an extensible markup language (XML) request. Next, at decision step 210 a decision is made in order to determine whether the data network connection device 102 (FIG. 1), e.g., diagnostic module 124 (FIG. 1) therein, can determine the cause of the problem. If the data network connection device 102 (FIG. 1) cannot determine the cause of the problem, an indication is sent to the computer 104 (FIG. 1) to indicate to the user to contact the ISP directly, e.g., via the analog telephone 106 (FIG. 1), in order to further troubleshoot the broadband connection issue. The logic then ends at state 206.

At decision step 210, if the data network connection device 102 (FIG. 1) can determine the cause of the problem, the logic proceeds to block 214 and determines the cause of the problem with the broadband connection to the computer 104 (FIG. 1). Continuing to block 216, information is sent from the data network connection device 102 (FIG. 1) and received by the computer 104 (FIG. 1). At block 218, the information from the data network connection device 102 (FIG. 1) is integrated with the diagnostic information determined locally by the diagnostic module 120 (FIG. 1). Thereafter, at block 220, an attempt is made to correct the problem with the broadband connection based on the information obtained by the data network connection device 102 (FIG. 1), and sent to the computer, and any information obtained locally. Moving to decision step 222, a determination is undertaken by the diagnostic module 120 (FIG. 1) at the computer 104 (FIG. 1) in order to ascertain whether the problem is corrected. If the problem is not corrected the logic continues to block 224 and an indication is sent to the computer 104 (FIG. 1) asking the user to contact the ISP directly in order to troubleshoot the broadband connection to the computer 104 (FIG. 1). The logic then ends at state 206.

Figure 3:
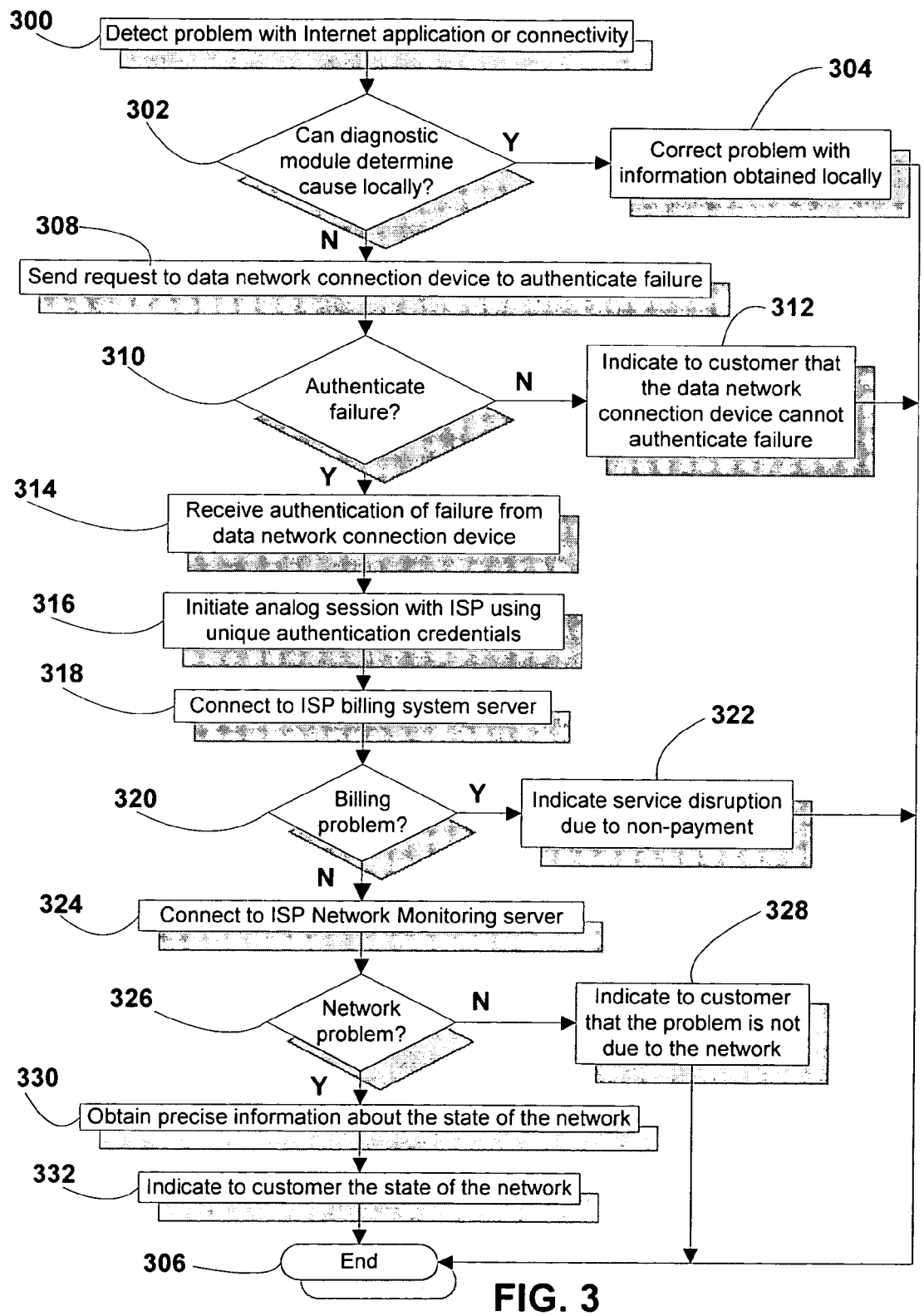
FIG. 3 is a flow chart to illustrate an alternative method for troubleshooting a broadband connection.

Referring now to FIG. 3, an alternative method for troubleshooting a broadband connection is shown and commences at block 300 where a problem is detected with a broadband application at the computer 104 (FIG. 1) or with broadband connectivity to the computer 104 (FIG. 1). At decision step 302, a determination is made in order to ascertain whether the diagnostic module 120 (FIG. 1) at the computer 104 (FIG. 1) can determine the cause of the problem locally. If so, the logic proceeds to block 304 and the problem is corrected locally by the diagnostic module 120 (FIG. 1). The logic then ends at state 306.

Returning to decision step 302, if the diagnostic module 120 (FIG. 1) cannot determine the cause of the problem locally, a request is sent to the data network connection device 102 (FIG. 1) to authenticate the failure of the broadband connection to the computer 104 (FIG. 1). In a particular embodiment, the request is sent in XML to the PPPoE enabled data network connection device 102 (FIG. 1). Next, at decision step 310 a decision is made in order to determine whether the data network connection device 102 (FIG. 1) can authenticate the failure. If the data network connection device 102 (FIG. 1) cannot authenticate the failure, the logic moves to block 312 and an indication is sent to the computer 104 (FIG. 1) that the failure cannot be authenticated by the data network connection device 102 (FIG. 1). The logic then ends at state 306.

At decision step 310 if the data network connection device 102 (FIG. 1) can authenticate the failure, the logic proceeds to block 314 and the computer 104 (FIG. 1) receives an authentication of failure of the broadband connection from the data network connection device 102 (FIG. 1). Continuing to block 316, an analog session is initiation with the ISP modem bank server 112 (FIG. 1) using unique authentication credentials to authenticate the analog session with the ISP modem bank server 112 (FIG. 1). In a particular embodiment, the set of authentication credentials can include a device identification number, a user identification number, a password, etc. Particularly, the credentials to authenticate the analog session are different than credentials used to initiate and authenticate a broadband session between the computer 104 (FIG. 1) and the ISP provider 110 (FIG. 1). Moving to block 318, the data network connection device 102 (FIG. 1) connects to the ISP billing system server 116. Next, at decision step 320, a determination is made as to whether the cause of the problem is a billing problem, e.g., non-payment of a bill. Particularly, that determination can be made by querying the ISP billing system server 116 (FIG. 1) from the data network connection device 102 (FIG. 1). If the cause of the problem is a billing problem, the logic moves to block 322, and an indication is sent to the computer 104 (FIG. 1) that the disruption of the broadband service is due to non-payment. The logic then ends at state 306.

Returning to decision step 320, if the problem with the broadband connection is not a billing problem, the logic moves to block 324 and the data network connection device 102 (FIG. 1) connects to the ISP network monitoring server 114. Proceeding to decision step 326, a determination is made in order to determine whether the problem is a network problem. If the problem is not a network problem, the logic moves to block 328 and an indication is sent to the computer 102 (FIG. 1) that the problem is not due to the network. As such, the user may have to further troubleshoot the computer 104 (FIG. 1) to determine if the problem is due to, for example, a software error. The logic then ends at state 306. On the other hand, at decision step 326, if the problem is a network problem, the data network connection device 102 (FIG. 1) obtains precise information about the state of the network at block 330. Next, at block 332, an indication is sent to the computer 104 (FIG. 1) and the user concerning the state of the network. The logic then ends at state 306. The indication can include information concerning whether the entire network is down, whether the network is currently being repaired, or any other information concerning the network.

Figure 4:
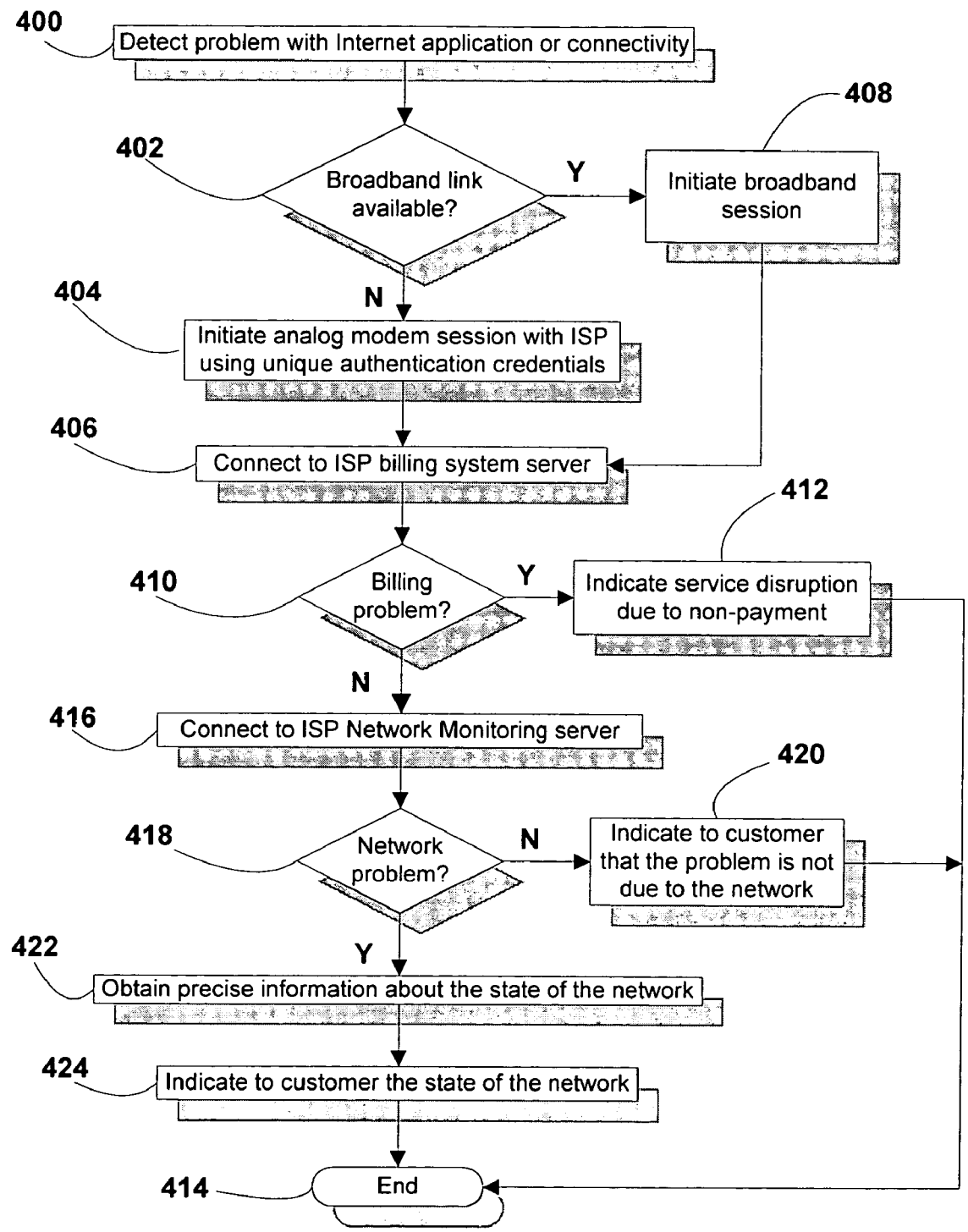
FIG. 4 is a flow chart to illustrate another alternative method for troubleshooting a broadband connection.

FIG. 4 shows another alternative method for troubleshooting a broadband connection. Commencing at block 400, a problem is detected with an Internet application or connectivity at the IP telephone 108 (FIG. 1), e.g., by the diagnostic module 122 (FIG. 1) within the IP telephone 108 (FIG. 1). At decision step 402, a determination is made in order to ascertain whether a broadband link is available at the data network connection device 102 (FIG. 1), e.g., by querying the data network connection device 102 (FIG. 1). If a broadband link is not available, the logic proceeds to block 404 and an analog session is initiation between the ISP modem bank server 112 (FIG. 1) and the data network connection device 102 (FIG. 1). In a particular embodiment, the analog session is initiated using unique credentials in order to authenticate the analog session with the ISP modem bank server 112 (FIG. 1). Particularly, the credentials used to authenticate the analog session are different than credentials that are used to authenticate a broadband session. Moving to block 406, the data network connection device 102 (FIG. 1) connects to the ISP billing system server 112. The logic then moves to decision step 410.

Returning to decision step 402, if a broadband link is available, the logic moves to block 408 and a broadband session is initiated at the data network connection device 102 (FIG. 1). The logic then proceeds to decision step 410. At decision step 410, a determination is made in order to ascertain whether the cause of the problem is a billing problem, e.g., non-payment of a bill. If the cause of the problem is a billing problem, the logic moves to block 412, and an indication is sent to the customer that the disruption of the broadband service is due to non-payment.

In a particular embodiment, the indication is sent to the customer via the broadband connection between the data network connection device 102 (FIG. 1) and the IP telephone 108 (FIG. 1). Specifically, a digital message consisting of pre-recorded voice data packets can be sent to the IP telephone 108 (FIG. 1), e.g., as a VoIP telephone call. The message can be listened to in real-time or it can be recorded at the IP telephone 108 (FIG. 1) and listened to later. The digital message can also include text data packets that are sent to the IP telephone 108 (FIG. 1) and displayed at a display screen on the IP telephone 108 (FIG. 1).

In another particular embodiment, the indication can be sent to the customer via the analog connection between the data network connection device 102 (FIG. 1) and the analog telephone 106 (FIG. 1). Particularly, a pre-recorded analog message can be sent to analog telephone 106 (FIG. 1) where it can be listened to by the customer, e.g., in real time or as a recorded voice mail message. After the indication is sent to the customer, either via the analog telephone 106 (FIG. 1) or the IP telephone 108 (FIG. 1), the logic ends at state 414.

Returning to decision step 410, if the problem with the broadband connection is not a billing problem, the logic moves to block 416 and the data network connection device 102 (FIG. 1) connects to the ISP network monitoring server 114 (FIG. 1). Proceeding to decision step 418, a determination is made in order to determine whether the problem is a network problem. If the problem is not a network problem, the logic moves to block 420 and an indication is sent to customer that the problem is not due to the network. As such, the user may have to further troubleshoot the IP telephone 108 to determine if the problem is due to an internal problem with the IP telephone 108. Depending on the session initiated above, e.g., analog or broadband, the indication is sent from the data network connection device 102 (FIG. 1) to the analog telephone 106 (FIG. 1) or from the data network connection device 102 (FIG. 1) to the IP telephone 108 (FIG. 1). The logic then ends at state 414.

On the other hand, at decision step 418, if the problem is a network problem, the data network connection device 102 (FIG. 1) can obtain precise information about the state of the network at block 422. Next, at block 424, an indication is sent to the customer concerning the state of the network. The indication can be sent to the analog telephone 106 (FIG. 1) or the IP telephone (FIG. 1) depending on the session initiated above. Further, the indication can include information on whether the network or a server within the network is currently down, under repair, being upgraded, etc. The logic then ends at state 414.

With the configuration of structure described above, the system and method for troubleshooting broadband connections provides capability for troubleshooting a problem with a broadband connection at a user computer using information obtained by the user computer and using information obtained by other components in the system, e.g., a data network connection device. Information relating to the problem can be sent to the user computer by the data network connection device. For example, if broadband service to a user computer is interrupted the user computer can request that the data network connection device determine the cause of the interruption. The data network connection device can then contact an Internet service provider via a backup or reserve connection, e.g., a second broadband connection established using a second set of authentication credentials or an analog connection that can be established using a second set of authentication credentials. With the reserve connection, the data network connection device can determine if the interruption is due to a legitimate problem with the broadband network or simply a billing matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for resolving one or more problems with a broadband connection, the method comprising:
   detecting a problem with the broadband connection at an end device;
   determining whether the problem can be resolved at the end device;
   requesting that a data network connection device connected remotely to the end device attempt to determine the cause of the problem after determining that the end device cannot resolve the problem;
   determining if the broadband connection is available; and
   when the broadband connection is available, initiating a broadband data communication session via the data network connection device using a first set of authentication credentials.

2. The method of claim 1, further comprising:
   resolving the problem at the end device at least partially based on information obtained by the data network connection device.

3. The method of claim 2, further comprising:
   resolving the problem at the end device at least partially based on information obtained by the end device.

4. The method of claim 1, further comprising:
   establishing an analog data communication session between the data network connection device and an Internet service provider;
   using the analog data communication session, sending an inquiry to a billing server to determine if the problem is a billing problem; and
   receiving an indication from the billing server that the problem is a billing problem.

5. The method of claim 4, further comprising:
   using the analog data communication session, determining if the problem is a network problem.

6. The method of claim 1, further comprising
   when the broadband connection is unavailable, initiating an analog communication session via the data network connection device using a second set of authentication credentials.

7. The method of claim 6, wherein the second set of authentication credentials are different from the first set of authentication credentials.

8. The method of claim 1, wherein the end device is a computer.

9. The method of claim 1, wherein the end device is an Internet protocol telephone.

10. The method of claim 1, wherein the data network connection device is a router.

11. The method of claim 1, wherein the data network connection device is a modem.

12. The method of claim 1, wherein the data network connection device is a gateway.

13. The method of claim 1, wherein the data network connection device can be used to initiate a broadband communication session with an Internet service provider using a first set of authentication credentials.

14. The method of claim 13, wherein the data network connection device can be used to initiate an analog communication session with an Internet service provider using a second set of authentication credentials that is different from the first set of authentication credentials.

15. The method of claim 13, wherein the data network connection device can be used to initiate a broadband communication session with an Internet service provider using a second set of authentication credentials that are different from the first set of authentication credentials.

16. The method of claim 1, wherein the broadband connection is a digital subscriber line (DSL) connection.

17. A network system, comprising:
   a data network connection device;
   an Internet service provider remotely coupled to the data network connection device;
   a computer coupled to the data network connection device;
   a first diagnostic module within the computer;
   wherein:
      the data network connection device is configured to establish a first data network connection to the Internet service provider using a first set of unique authentication credentials; and
      the data network connection device is configured to establish a second data network connection between the data network connection device and the Internet service provider when a problem with the first data network connection is determined by the first diagnostic module within the computer.

18. The system of claim 17, wherein the first data network connection is a first broadband connection and the second data network connection is a second broadband connection.

19. The system of claim 17, wherein the first data network connection is a broadband connection and the second data network connection is an analog connection.

20. The system of claim 17, further comprising:
   an Internet protocol telephone coupled to the data network connection device, the Internet protocol telephone including a second diagnostic module;
   wherein:
      the data network connection device is configured to establish the second data network connection between the data network connection device and the Internet service provider after a problem with the first data network connection is identified by the second diagnostic module within the Internet protocol telephone.

21. The system of claim 20, further comprising:
   an analog telephone coupled to the data network connection device;
   wherein:
      the data network connection device can retrieve network information from the Internet service provider; and
      the data network connection device can send the network information to the analog telephone.

22. A method for troubleshooting a data network connection, the method comprising:
   establishing a first data network connection between an end device and an Internet service provider using a first set of unique authentication credentials;
   establishing a second data network connection between a data network connection device and the Internet service provider when a problem with the first data network connection is determined by a diagnostic module within the end device;
   using the data network connection device to obtain network information for troubleshooting the problem with the first data network connection; and
   transmitting the network information to the end device.

23. The method of claim 22, wherein the first data network connection is established using a first set of authentication credentials and the second data network connection is established using a second set of authentication credentials.

24. The method of claim 22, wherein the end device is a computer.

25. The method of claim 22, wherein the end device is an Internet protocol telephone.

26. The method of claim 22, wherein the data network connection device is a router.

27. The method of claim 22, wherein the data network connection device is a modem.

28. The method of claim 22, wherein the data network connection device is a gateway.

29. The system of claim 22, wherein the first data network connection is a broadband connection and the second data network connection is a broadband connection.

30. The system of claim 22, wherein the first data network connection is a broadband connection and the second data network connection is an analog connection.

* * * * *